United States Patent
Canedo et al.

(10) Patent No.: US 10,274,930 B2
(45) Date of Patent: Apr. 30, 2019

(54) MACHINE HUMAN INTERFACE—MHI

(71) Applicant: Siemens Aktiengesellschaft, Munich (DE)

(72) Inventors: Arquimedes Martinez Canedo, Plainsboro, NJ (US); Lingyun Wang, Princeton, NJ (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 288 days.

(21) Appl. No.: 15/237,777

(22) Filed: Aug. 16, 2016

(65) Prior Publication Data

US 2017/0038762 A1    Feb. 9, 2017

(51) Int. Cl.
*B25J 9/16* (2006.01)
*G06N 3/04* (2006.01)
*G05B 19/406* (2006.01)
*G05B 19/418* (2006.01)

(52) U.S. Cl.
CPC .......... *G05B 19/406* (2013.01); *B25J 9/1674* (2013.01); *G05B 19/41865* (2013.01); *G05B 2219/32009* (2013.01); *G05B 2219/40202* (2013.01); *G06N 3/0454* (2013.01); *Y02P 90/20* (2015.11)

(58) Field of Classification Search
CPC .................... G05B 19/406–19/4069
See application file for complete search history.

(56) References Cited

U.S. PATENT DOCUMENTS

2005/0232491 A1* 10/2005 Chang ................ G06K 9/00362
382/199
2012/0056800 A1* 3/2012 Williams ................ G06F 3/011
345/156
2016/0224012 A1* 8/2016 Hunt .................. G05B 19/4061

OTHER PUBLICATIONS

Sprdlik, Otakar, "Detection and Estimation of Human Movement Using Internal Sensors: Applications in Neurology", Czech Technical University in Prague, 2012. (Year: 2012).*

* cited by examiner

*Primary Examiner* — Amar Movva

(57) ABSTRACT

A method for operating a machine-human interface in an automation environment includes receiving or automatically retrieving, by a machine-human interface computer, sensor data corresponding to a plurality of humans working the automation environment. The machine-human interface computer applies a human model to the sensor data to yield a plurality of human state records, each human state record corresponding to one of the humans working within the automation environment. The machine-human interface computer also identifies automation tasks using a factory state schedule. Based on the plurality of human state records, the machine-human interface computer assigns the automation tasks to the plurality of humans.

9 Claims, 4 Drawing Sheets

MACHINE HUMAN INTERFACE—MHI

CROSS-REFERENCE TO RELATED APPLICATIONS

This application claims the benefit of U.S. Provisional Application Ser. No. 62/200,148 filed Aug. 17, 2015 which is incorporated herein by reference in its entirety.

TECHNICAL FIELD

The present invention relates generally to a skill interface for a machine human interface, along with methods, systems, and apparatuses related thereto. The disclosed technology may be applied to, for example, various automated production environments.

BACKGROUND

Manufacturing processes are highly automated and may be divided into several hierarchical layers. For example, at the highest level, the enterprise resource planning (ERP) takes place, which may be referred to as a business layer. At lower levels, the hardware implementation and control take place, which may be referred to as various control or unit layer. An intermediate layer integrates and connects business and control layers. This intermediate layer includes a manufacturing execution system (MES) that defines an MES process in terms of data and interactions between functions, such as resource management, resource allocation, dispatching, data collection and acquisition, quality assurance management, maintenance management, performance analysis, scheduling, document control, labor management and material and production tracking.

The interaction between humans and machines during the manufacturing process is done through interfaces referred to as Human Machine Interfaces (HMIs). The HMI is the single entry point to the machine world for machine operators; it provides humans the status information about the machines such as position, velocity, temperature, etc. Using this information, the human provides commands to the machines to modify their behavior; for example, for them to stop, to move, to mill, to drill, etc.

HMI technology is human-centric, built for humans to understand machines. Thus, HMI typically focuses on techniques receiving information from machines and presenting in a manner that allows a human to quickly review and respond accordingly. However, aside from this presentation, the automation system largely ignores the important roles of humans in the automation environment. This exposes a deficiency in the system because the safety, quality and efficiency overall automation system is highly dependent on how humans interact it.

The separation between humans and machines in the automation environment has traditionally made sense because each machine produces data which may be captured and analyzed to ascertain the machine's state. Moreover, protocols and translation mechanisms exists for allowing efficient machine-to-machine (M2M) communications. Human communications, on the other hand, tend to be less data-centric and (outside of the HMI) the machines operate largely unaware of the presence of any humans in the automation environment. At the same time, the day-to-day activities of humans generate a great deal data (e.g., body measurements acquired by physical sensor, location data, email and text messages, etc.).

Accordingly, it is desired to leverage the available data generated by humans to integrate humans into the automation environment in a manner that enhances machine-to-human communications beyond the capabilities currently available in HMI technology.

SUMMARY

Embodiments of the present invention address and overcome one or more of the above shortcomings and drawbacks, by providing methods, systems, and apparatuses related to a machine human interface for industrial applications. The MHI described herein allows machines to better interact and understand human behavior and our world.

According to some embodiments, a method for operating a machine-human interface in an automation environment includes receiving or automatically retrieving, by a machine-human interface computer, sensor data corresponding to a plurality of humans working the automation environment. The machine-human interface computer applies a human model (e.g., artificial neural network) to the sensor data to yield a plurality of human state records. Each human state record corresponds to one of the humans working within the automation environment. These human state records may comprise, for example, physical status information and emotional status associated with one of the humans. The machine-human interface computer identifies automation tasks using a factory state schedule. Based on the human state records, the machine-human interface computer assigns the automation tasks to the humans.

In some embodiments, the aforementioned method further includes identifying one or more potentially unsafe conditions in the automation environment based on the human state records. Based on this identification, an alert may be transmitted to one or more of the humans. Additionally (or alternatively), instructions may be sent to a machine in the automation environment causing a processor associated with the machine to change a speed of operation of the machine or to stop its operation.

Various types of sensor data may be used with the aforementioned method. For example, in one embodiment, the sensor data comprises one or more of email data, calendar data, and social media data that the machine-human interface computer retrieves from one or more external servers hosting data associated with the humans. In another embodiment, the sensor data comprises body measurement data acquired by the machine-human interface from body measurement sensors located on the humans. In another embodiment, the sensor data comprises of location sensor data tracking current positions associated with the humans.

According to another aspect of the present invention, a method for operating a machine-human interface in an automation environment includes a machine-human interface computer receiving or retrieving sensor data corresponding to a plurality of humans working the automation environment. The machine-human interface computer applies a human model to the sensor data to yield a plurality of human state records, each human state record corresponding to one of the humans working thin the automation environment, and identifies potentially unsafe conditions in the automation environment based on the plurality of human state records. In some embodiments, the method further includes sending an alert to one or more of the humans based on identification of the potentially unsafe conditions in the automation environment. In other embodiments, instructions are sent to a machine in the automation environment based on identification of the unsafe conditions. These instructions cause a processor associated with the machine to change a speed of operation of the machine or stop operation of the machine.

According to other embodiments of the present invention a machine-human interface system for use in an automation environment comprises a computing device comprising one or more processors and a non-transitory, computer-readable storage medium in operable communication with the processors. The computer-readable storage medium comprises one or more programming instructions that, when executed, cause the processors to execute a plurality of components comprising a machine interface component, a data fusion component, a human model, and a decision making component. The machine interface component is configured to send and receive data to one or more machines in the automation environment. The data fusion component comprising a plurality of sensor modules, each sensor module configured to retrieve human sensor data from a sensor data source. The human model is configured to maintain a human state record for each human in the automation environment based on the human sensor data retrieved by the data fusion component, and the decision making component is configured to perform one or more decision making operations related to the automation environment based on the human state record for each human in the automation environment and a factory state record. These decision making operations may comprise, for example, allocation of tasks to each human in the automation environment, one or more pre-emptive safety actions (e.g., stopping or slowing down a machine), or generating a suggested redesign of the automation environment. In some embodiments, the aforementioned system further includes a plurality of displays located proximal to the humans in the automation environment and configured to present allocated task assignments in a human-readable format.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses associated with a machine human interface (MHI) which allows machines to better interact and understand human behavior and our world. When combined, HMIs and MHIs provide a bidirectional communication system for machines and for humans.

Figure 1:
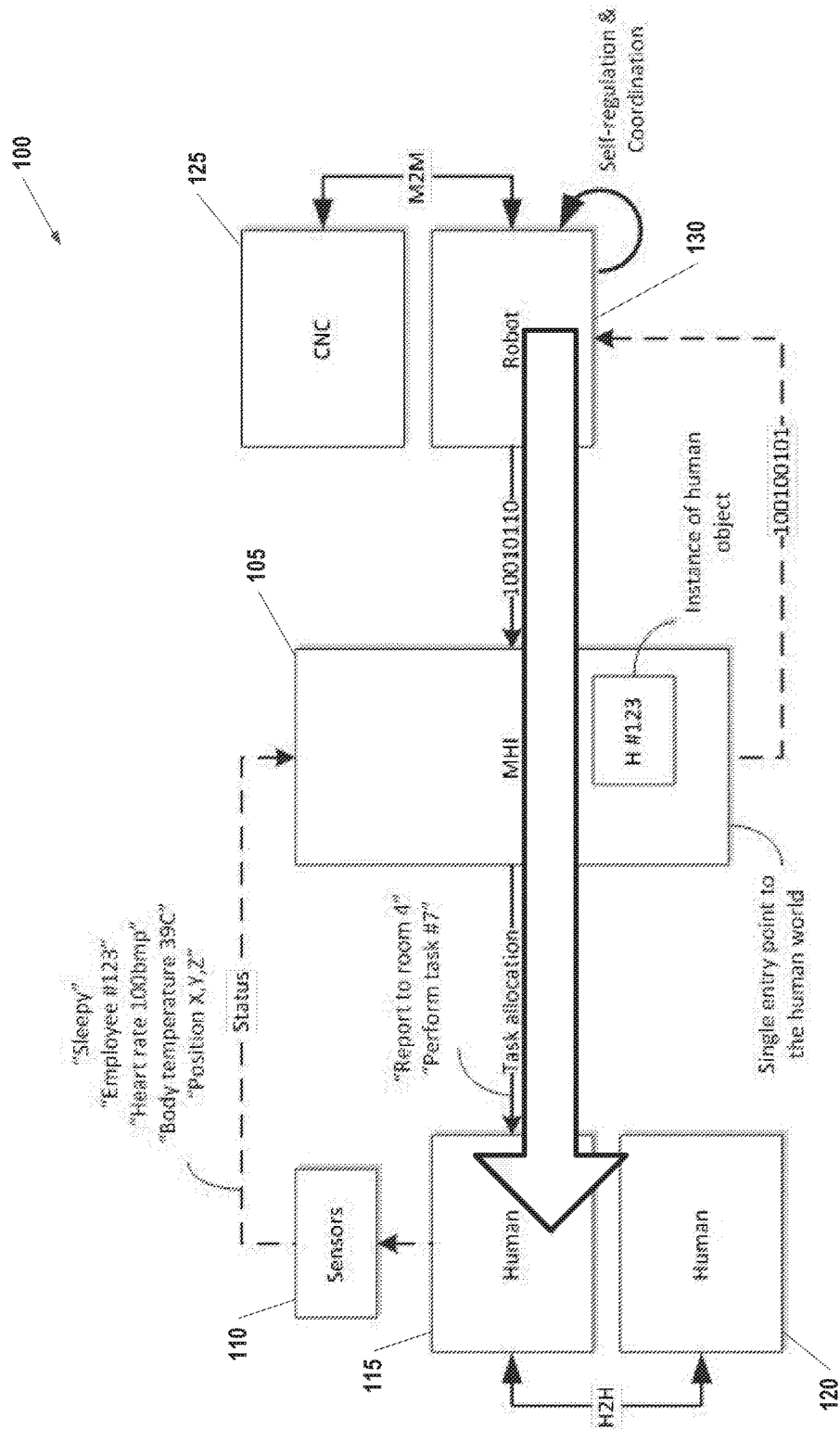
FIG. 1 shows a high-level overview of an automation system environment which includes a MHI, according to some embodiments of the present invention.

FIG. 1 shows a high-level overview of an automation system environment 100 which includes a MHI 105, according to some embodiments of the present invention. Briefly, the MHI is a computer that may function as an independent computing unit or as part of a machine (e.g., robot, CNC machine, etc). In general the computer can reside anywhere in the factory or, in some embodiments, the computer may reside in a cloud-based environment connected to the factory over a computing network such as the Internet. Human Sensors 110 are used by the MHI to capture the status of individuals and characterize them as humans, not as other "machines." In the example of FIG. 1 two Humans 115, 120 are shown; however, it should be understood that the concepts presented in this example may be scaled to any number of humans that may interact with the automation system environment 100. The Sensors 110 can generally be any sensors known in the art that collects information about a human subject. For example, in some embodiments, the Sensors 110 may comprise environmental sensors such as microphone arrays installed in the rooms that monitor activity and improve localization, wearables such as bracelets that record heart activity, accelerometers in mobile devices to track motion, machine learning sensors in communication systems (e.g., email, text messages, social networks) to identify behavioral patterns, and lidar sensors to map spaces. These Sensors 110 create a status for every human in the automation environment that is stored in the MHI 105, and also the environment they coexist with the machines.

The MHI 105 becomes the single entry point to the human world with a standardized interface to the Humans 115, 120. Individual characteristics may be stored as properties of the human objects in the MHI 105. An advantage of humans in an MHI 105 over machines in an HMI is that humans are homogeneous whereas machines can be of several types.

Machines can query the MHI 105 as an application programming interface for the human world. In the example of FIG. 1 a Computer Numerical Control (CNC) Machine 125 and a Robot Machine 130 are shown; however, as with the Humans 115, 120, the number of machines can be scaled as need. Using the information gathered by the machines in the automation system environment 100 can build an accurate state of the human world. This allows enhanced operations to be performed which leverage the collective capabilities of the Machines 125, 130 and the Humans 115, 120. For example, if Human 115 is sleepy and is showing signs of sickness with an elevated body temperature, the Machines 125, 130 can emit a command for Human 115 to take a less physical intensive task (e.g., "Report to room #4 and perform task 7"). As another example, if Human 115 is identified as being upset and prone to walk to a high-risk area, a Robot Machine 130 can reduce its operation speed to avoid a potential accident. It should be noted that self-regulation and coordination with other machines to improve safety may have tradeoffs in production performance.

Figure 2:
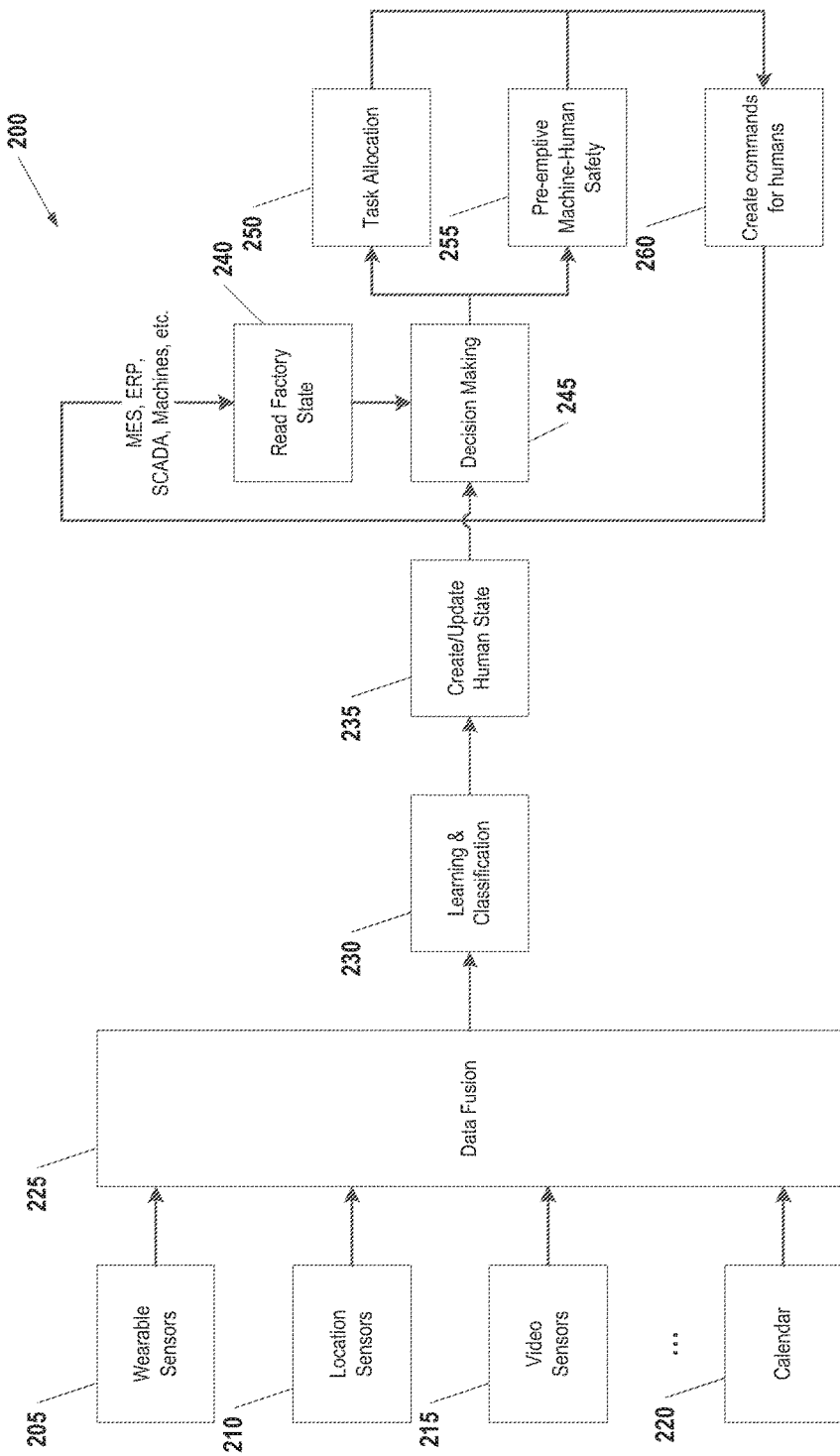
FIG. 2 provides an example of workflow which may be used to create and apply the human models, according to some embodiments of the present invention.

FIG. 2 provides an example of workflow 200 which may be used to create and apply the human models, according to some embodiments. In this example, there are four types of sensor data available: Wearable Sensors 205, Location Sensors 210, Video Sensors 215, and Calendar Data 220. A Data Fusion Component 225 within the MHI gathers the sensor data and extracts portions of the sensor data that are relevant for human modeling. Then, the Data Fusion Component 225 translates these portions into a format suitable for MHI processing. In some embodiments, a standard language such as Extensible Markup Language (XML) may be used for formatting the data and presenting to other components for modeling. One benefit of a language such as XML is that is presents the data in a human-readable form. Thus, the data may be periodically reviewed to perform verification and validation procedures on the MHI or otherwise understand the behavior of the MHI.

The exact details of an extraction and translation performed by the Data Fusion Component will vary according to the type of data being processed. Thus, in some embodiments, the Data Fusion Component may include a plurality of extraction, translation, and loading (ETL) modules which are specialized for a particular type of data. In some embodiments, each ETL module further includes communication functionality for receiving or retrieving the sensor data. For example, the Data Fusion Component may include an email module which is configured to retrieve an individual's emails from an email server, extract relevant fields from those emails, and create a new XML file with the extracted data. In some instances, the module may be able to leverage publicly available application programming interfaces (APIs) to access certain data sources. For example, for example Fitbit™ offers an API for communicating with its body sensors. In instances where an API is not available, more specialized interfaces may be developed. Additionally, the HMI may be configured to allow data to be "pushed" to it in some embodiments. For example, an app on a human's phone may be used to push location information to the MHI via Bluetooth as the individual walks past the MHI. It should be noted that the module-based approach for implementing the Data Fusion Component provides greater flexibility and robustness in the overall design of the MHI because it localizes changes that need to be made to the MHI to support a new data type. Thus, for example, to support a new type of body sensor, the only changes to the MHI would be adding a new module to the Data Fusion Component and possibly retraining any pre-existing models.

After being processed by the Data Fusion Component 225, learning and classification is performed at step 230. This step 230 applies one or more human models which use sensor data to identify a state associated with each human in the automation system environment. These human models can be trained, for example, based on the past behavior of the humans in the automation system environment 100 or based on another similar training dataset using supervised or unsupervised methods. Each training dataset may also be directed to a particular type of information. For example, for textual data (e.g., emails, text messages, social media content, calendar data), certain keywords, sentences, or metadata (e.g., frequency of post, transmission time, etc.) may be correlated particular human states.

In general, any model generally known in the art may be used; however, more complex models may be preferable in instances where a homogenous set of human sensor data is provided to the MHI. For example, it would be straightforward to correlate a highly elevated heartbeat as being a potential indicator that an individual is in distress. However, it would be more challenging to determine an individual is in distress when no single sensor data item, considered individually, indicates distress. In these instances, the human models may be implemented via a deep learning network such as, for example, an artificial neural network. In some embodiments, these deep learning networks are trained using artificial datasets. Alternatively (or additionally), reinforcement learning techniques may be used. For example, a deep learning model can be trained by monitoring human sensor data over a certain period and correlating it with efficiency measurements and a record of safety incidents over that period.

After the human models applied to the sensor data, the results of the model are used at step 235 to create and update a state representation of the corresponding human. The exact contents of the human state record can vary across different embodiments. Additionally the granularity of the information may vary across embodiments. For example in some embodiments, binary states may be used (e.g., "fit to work" or "not fit to work"). In other embodiments, more complex representations of state may be used to capture various emotion and physical characteristics. For example, in some embodiments, the human state record may include a plurality of binary fields indicating whether a human is in distress, angry, happy, tired, etc. Additionally, the various characteristics may be presented by a range of values rather than a binary value. Thus, rather than simply indicating whether the human is tired or not, a representation of the human's sleepiness may be represented by a number between 0 ("wide awake") and 10 ("asleep"). In this way, predictions may be made about a human's future state in a more detailed manner. Aside from the characteristics describe above, the human state record includes an identifier of the human (e.g., employee number) and possibly other identifying information (e.g., job title, contact information, etc.).

Continuing with reference to FIG. 2, once the human state records have been created or updated, they may be used to perform decision making at step 245. As an input to the decision making step 245, the factory state is read at step 240. The factory state may include information from sources such as the MES, ERP, SCADA, or even individual machines. In some instances, the factory state may include an explicit request for a decision to be made. For example, a machine may request human intervention with a particular process. But, decisions may also be inferred. For example, based on analysis of the human state records and the factory state, it may be inferred that one or more humans are in a potentially unsafe position with respect to machines in the automation environment. In this case, it may be inferred that the MHI must decide how to modify the human state or the factory state to address the unsafe situation.

Once a decision has been made, it must be implemented. In FIG. 2, two example implementation steps are shown: a task allocation step 250 and a pre-emptive machine-human safety step 255. The task allocation step 250 is performed when the decision making process performed at step 245 determines that a new task needs to be performed or an existing task must be reassigned. To facilitate task allocation, step 250 identifies a particular human to be assigned to the a task. For example, if the decision making step 245 determines that a human is required to operate a laser cutting machine, the task allocation process may identify a particular human based on that human's skill set, emotional and physical state, and current location.

If the decision making step 245 determines that an unsafe condition currently exists or will exist in the near future, a pre-emptive machine-human safety step 255 is performed. During this step 255, the MHI examines the human state records and the factory states and determines how to alleviate the unsafe condition by modifying the human or factory states. For example, if decision making step 245 determines that a particular human is in an unsafe location with respect to a particular machine, the pre-emptive machine-human safety step may decide that the unsafe condition may be alleviated by sending an alert to the human indicating that they should move to a different location. Alternatively (or additionally) commands may be sent to the machines instructing them to slow down or stop. At step 260 commands are created and sent to humans as needed by the task allocation and pre-emptive machine-human safety measures. Thus, for example, if an alert needs to be sent to a particular human, at step 250 the human may be identified and the best means of communication e.g., HMI near the human's location, text message to the human's mobile device etc.) may be selected and used to send the alert. These commands also provide valuable information regarding the automation environment in general, thus they are also used to update the factory state for later iterations of the decision making process.

Figure 3:
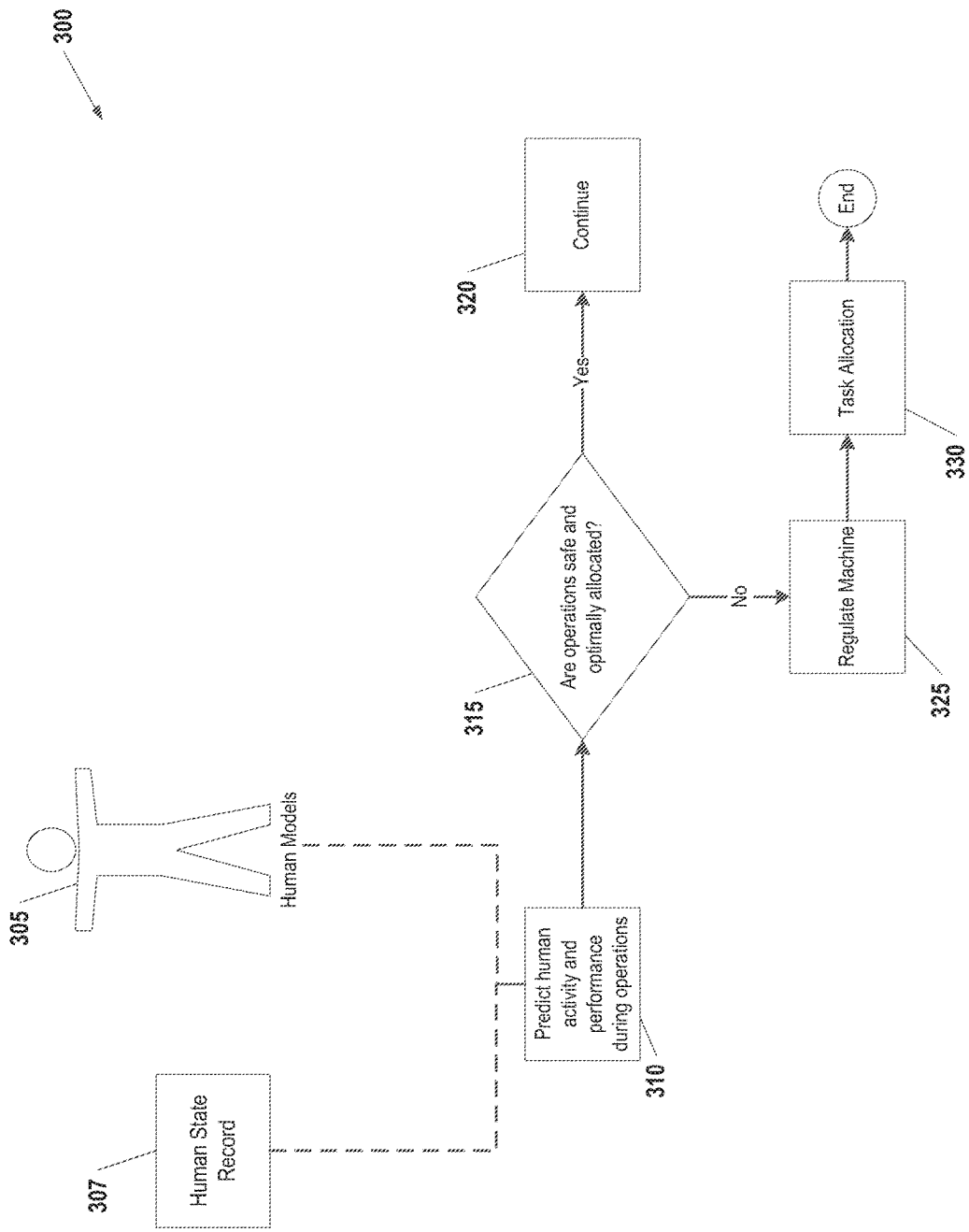
FIG. 3 provides an example workflow which demonstrates that the human state record developed through learning and classification of human sensor data may also be applied to optimize task performance in the automation environment, according to some embodiments of the present invention.

FIG. 3 provides an example workflow 300 which demonstrates that the human state record 307 developed through learning and classification of human sensor data may also be applied to optimize task performance in the automation environment. Here, at step 310, the Human Models 305 are applied to the current Human State Record 307 in order to predict human activity and performance during operations. This prediction may be made for operations in the near future, as well as for the long-term. Note that the human state records themselves do not provide any direct information about how a particular state can affect performance. For example, a human may be emotionally upset or lack sleep. In this case, it may be predicted that the human will perform sub-optimal in tasks that require a great deal of activity from the human. Conversely, the human may be able to perform a task that requires relatively low energy. Thus, during step 310, the MHI examines the current and planned factory state (not shown in FIG. 3) and uses a model which extrapolates how the humans, in their current states, will operate.

Continuing with reference to FIG. 3, at step 315, the MHI uses the output of the predictive model to determine if the plant operations are safe and optimally allocated. If they are, the factory processes can continue as shown in step 320. If the plant operations are currently not safe (or will be unsafe in the near future), the MHI may regulate machines at step 325 as necessarily to take account of human activity. This may include, for example, slowing down machines or even stopping operation altogether. If the overall operation of the plant is not optimally allocated, the MHI may perform a task allocation step 330 which reassigns tasks to humans. Continuing with the example described above, if a human lacks sleep and need to be reassigned to a task requiring less attention, that human's task assignment may be exchanged with another human worker. Commands are then sent to the humans (as described above with respect to step 260) and the factory state is updated, as necessary.

Figure 4:
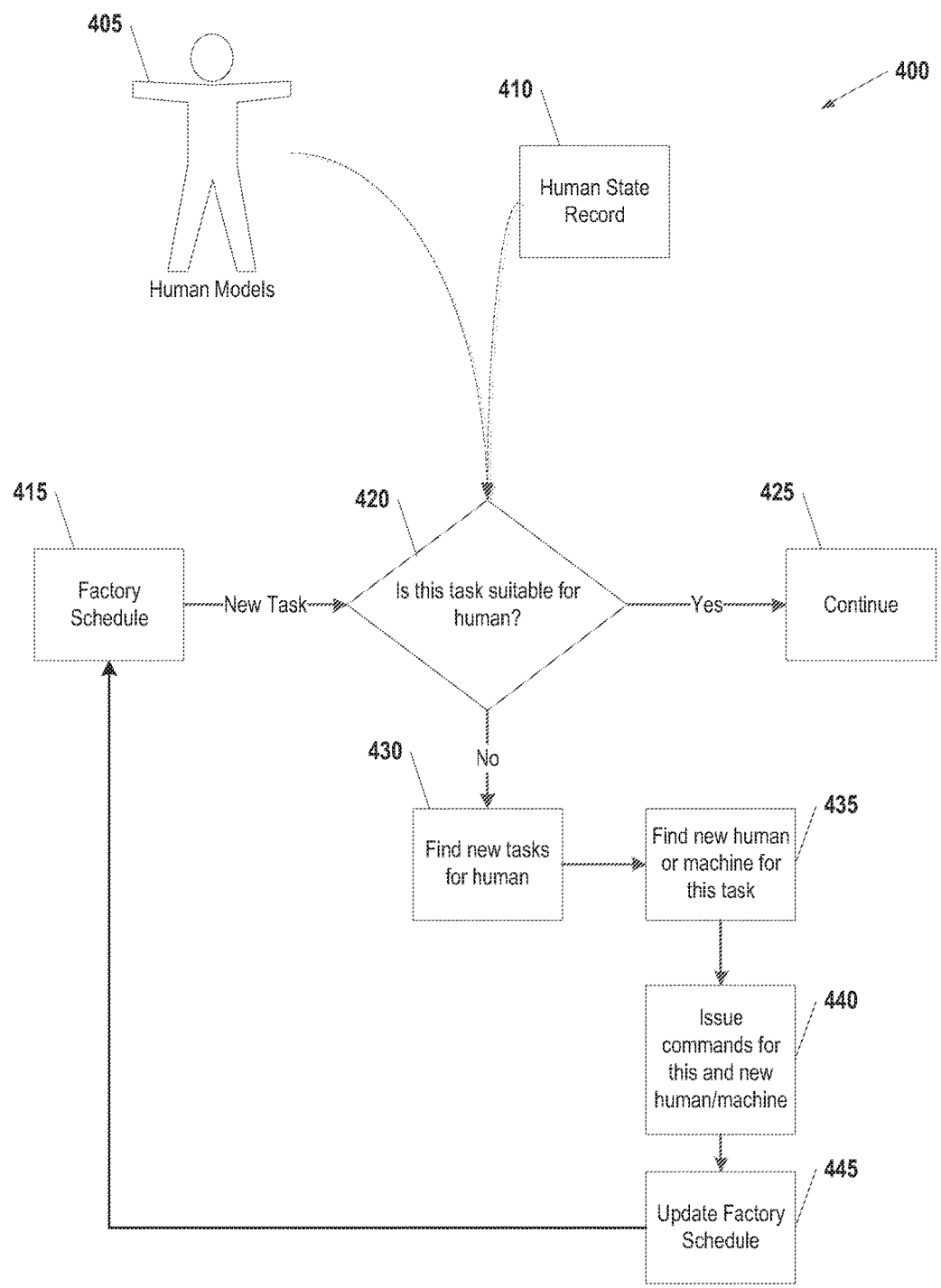
FIG. 4 provides a workflow that is applied when new tasks need to be assigned to humans in the automation environment, according to some embodiments of the present invention.

FIG. 4 provides a workflow 400 that is applied when new tasks need to be assigned to humans in the automation environment. New tasks are identified by monitoring the Factory Schedule 415. Each new task is analyzed to determine if it suitable for a human. Here, assume that the Factory Schedule 415 includes new task related to operation of a laser cutter that requires human operation. At step 420, the MHI uses the Human Models 405 and the Human State Records 410 to determine whether the task is suitable for a particular human.

If the task is suitable for this particular human, the MHI continues task process at step 425 by issuing commands to this particular human.

However, if the task is not suitable for this particular human, at step 430, the list of pending tasks from the Factory Schedule 415 are analyzed, again using the Human Models 405 and the Human State Record 410, to find a new task for the human. If there are no pending tasks suitable for the human, the human may be assigned a default task or, in some instances, told to stop working (e.g., take a break, end the human's shift, etc.). However, note that the laser cutting task remains unassigned. Thus, at step 435, the MHI attempts to find a new human to perform the task based on the other human state record data associated with humans currently working in the automation environment. In the event that a human cannot be found, machine may be assigned the task if it is capable of performing the necessary operations. If a machine is not capable and a human cannot be found, the automation may be stopped or alert can be issued to operators that no humans are capable of performing the necessary tasks. In this case, the operators may decide to cancel the order that is associated with the task and continue operations or to stop operations until a capable human is available to perform the task. Assuming that a human or machine can be found to perform the task, at step 440, the MHI issues commands for the tasks identified at steps 430 and 435. Then, the Factory Schedule 415 is updated accordingly at step 445.

Various devices described herein including, without limitation, the MHIs and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

The aforementioned MHIs and related computing infrastructure may include one or more processors for implementing the techniques described herein. The processors described herein as used by control devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

In some embodiments portions of the MHI, are implemented using one or more executable applications. An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A method for operating a machine-human interface in an automation environment, the method comprising:
    receiving or automatically retrieving, by a machine-human interface computer, sensor data corresponding to a plurality of humans working the automation environment, the sensor data sufficient to assign a value indicative of an ability to perform a particular task for each of the humans of the plurality of humans and to determine a location of the humans;
    applying, by the machine-human interface computer, a human model to the sensor data to yield a plurality of human state records, each human state record corresponding to one of the humans working in the automation environment; and
    identifying, by the machine-human interface computer, one or more potentially unsafe conditions between a particular human in the automation environment and the automation environment based on the plurality of human state records; and
    one of altering the operation of the automation environment and sending an alert to the particular human in the unsafe condition.

2. The method of claim 1, further comprising:
    sending an alert to one or more of the plurality of humans based on identification of the one or more potentially unsafe conditions in the automation environment.

3. The method of claim 1, further comprising:
    sending instructions to a machine in the automation environment based on identification of the one or more potentially unsafe conditions, the instructions causing a processor associated with the machine to change a speed of operation of the machine.

4. The method of claim 1, further comprising:
    sending instructions to a machine in the automation environment based on identification of the one or more potentially unsafe conditions, the instructions causing a processor associated with the machine to stop operation of the machine.

5. A machine-human interface system for use in an automation environment, the system comprising:
    a computing device comprising one or more processors and a non-transitory, computer-readable storage medium in operable communication with the processors, wherein the computer-readable storage medium comprises one or more programming instructions that, when executed, cause the processors to execute a plurality of components comprising:
        a machine interface component configured to send and receive data to one or more machines in the automation environment,
        a data fusion component comprising a plurality of sensor modules, each sensor module configured to retrieve human sensor data from a sensor data source, the sensor data sufficient to assign a value indicative of an ability to perform a particular task for each of the humans of the plurality of humans,
        a human model configured to maintain a human state record for each human in the automation environment based on the human sensor data retrieved by the data fusion component, the sensor data and the human model being sufficient to identify each individual human, and
        a decision making component configured to perform one or more decision making operations related to the automation environment based on the human state record for each human in the automation environment and a factory state record, wherein the decision making operations comprise allocation of tasks to each human in the automation environment, and wherein the decision making component assigns each task to a particular human based at least in part on the value and the human model.

6. The system of claim 5, further comprising:
    a plurality of displays located proximal to the humans in the automation environment and configured to present allocated task assignments in a human-readable format.

7. The system of claim 5, wherein the decision making operations comprise one or more pre-emptive safety actions.

8. The system of claim 7, wherein the pre-emptive safety actions comprise stopping a machine in the automation environment and the machine interface is configured to transmit one or more instructions operable to perform a stopping operation on a corresponding machine.

9. The system of claim 5, wherein the one or more decision making operations comprise generating a suggested redesign of the automation environment.

* * * * *